Aug. 7, 1956 A. E. BALLARD 2,758,007
ETHER EXTRACTION OF URANIUM SALT FROM SOLUTIONS
Filed June 14, 1948
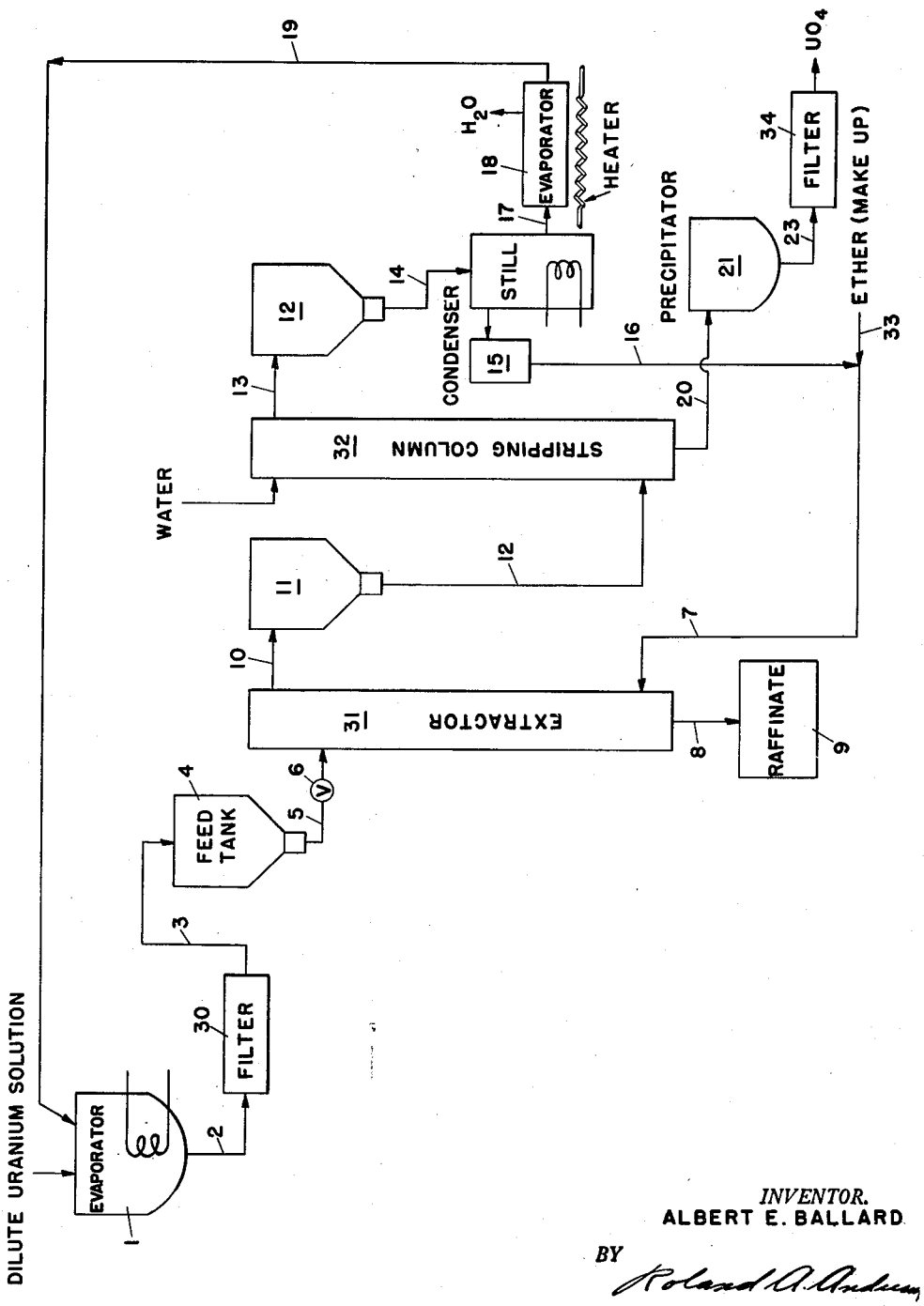
INVENTOR.
ALBERT E. BALLARD
BY
Roland A. Anderson 2,758,007

ETHER EXTRACTION OF URANIUM SALT FROM SOLUTIONS

Albert E. Ballard, Rochester, N. Y., assignor to the United States of America as represented by the United States Atomic Energy Commission Application June 14, 1948, Serial No. 32,832

4 Claims. (Cl. 23—14.5)

This invention relates to the recovery of uranium from aqueous solutions of the same, and more particularly the invention relates to the recovery of uranium in the form of uranyl nitrate from aqueous solutions containing, in addition, various extraneous materials in relatively high concentration with respect to the uranyl nitrate.

The properties of uranium are such that the separation of uranium from solutions containing other metallic ions is an expensive and often an extremely difficult process. This is particularly true when large quantities of solution are handled containing relatively small concentrations of the uranium compound in the presence of relatively large concentrations of other metallic ions. This becomes especially important when uranium is by far the most valuable component of such solutions, and the purity of the uranium separated from the solution is a factor of utmost importance.

The equipment used in processing uranium compounds, particularly the hexafluoride, is generally fabricated of such materials as copper, nickel, stainless steel and like materials. Nitric acid is generally employed to remove the uranium contamination from these metals, and since nitric acid tends to attack the metals themselves, often at a higher rate than the attack on the uranium-containing materials, the quantity of the extraneous material in the resultant solution may be many times in excess of the quantity of the more valuable uranium. In order to decrease the rate of attack by the nitric acid on the equipment, a metal salt is often added to the nitric acid solution to take advantage of the so-called "common-ion" effect. This increases still further the relative concentration of the extraneous material in the uranium solutions which are to be subjected to recovery treatment. A case in point is the addition of copper nitrate to nitric acid for use in the cleaning of copper equipment. Thus, these solutions which are to be treated to recover the uranium often contain concentrations of extraneous ions far in excess of the concentration of the relatively valuable uranium, these extraneous materials being chiefly ferric, chromium, manganese, nickel and copper nitrates. Accordingly, the difficulty involved in separating the uranium from solutions of the type described is readily perceived. Chemical precipitations and fractional crystallization are obviously impractical especially in that the generally high level of radio-activity of the solution makes dangerous the necessarily large amounts of handling. It is desirable then to develop a method for separating uranium from nitric acid solutions containing a relatively high concentration of metallic ions other than uranium.

One of the objects of this invention then is to provide a method for the recovery of uranium from solutions of the type described. Another of the objects of this invention is to provide a method of separating relatively small amounts of uranyl nitrate from aqueous solutions in the presence of relatively large amounts of other nitrate salts such as iron, chromium, nickel and copper. Still another object of the invention is to provide a continuous method, readily controllable by remote means, for the separation of uranyl nitrate from solutions of the type described. A further object of the invention is to provide a method of recovering substantially all of the uranium dissolved in solutions of the type described with a high degree of efficiency. Still other objects will appear hereinafter.

This invention makes use of the selective solubility of uranyl nitrate in diethyl ether. The extraction of uranyl nitrate from aqueous solutions of the same has already been described in the literature. However, the distribution coefficient expressed as the ratio between the concentration of uranium in ether to the concentration of uranium in an aqueous solution in equilibrium with the ether is less than 1, even with saturated aqueous solutions of uranyl nitrate, thus making the extraction of the uranyl nitrate economically unfeasible when complete recovery is desired. On the other hand, by increasing the concentrations of the extraneous metal nitrates substantially to the point where the solution is saturated, the distribution coefficient of uranyl nitrate is increased to a remarkable extent. For example, the distribution coefficient obtained by treating a 1.98 normal uranyl nitrate solution which was also 9.33 normal in copper nitrate with diethyl ether was in excess of 160.

Thus, in order to recover the uranyl nitrate from an aqueous solution thereof containing other metallic nitrates in at least as great a concentration as the uranyl nitrate, the present invention provides first for the concentration of the solution substantially to saturation with respect to at least one of the extraneous metal nitrates. This concentrated solution is then brought into contact with diethyl ether which selectively extracts the uranyl nitrate from the concentrated solution. The solvent is then treated with water to strip it of the uranyl nitrate content, thus yielding an aqueous solution of uranyl nitrate from which the uranium is readily recoverable in a highly purified state.

In this process, the acidity of the concentrated solution is preferably adjusted to a pH in the range of about 0 to 2. This may be conveniently done by adding concentrated ammonium hydroxide, milk of lime or the like to the solution. The adjustment of the acidity to the range indicated is usually necessary to prevent the precipitation of copper nitrate which is relatively less soluble in strongly acid solutions, and also to prevent precipitation of various basic compounds when the pH is in excess of 3. Further, the tendency of ether to extract ferric nitrate from the concentrated aqueous solution is increased at relatively high acid concentrations.

The present process is extremely economical in many respects. By increasing the concentration of the extraneous metal nitrates in the uranyl nitrate solution, the volume of the ether required to obtain substantially complete extraction of the uranyl nitrate is reduced to a minimum and equilibrium is rapidly reached.

The aqueous solution of uranyl nitrate finally obtained may be used as such or may be subjected to recovery of the uranium by any convenient method. It is preferred to precipitate a uranium oxide from the aqueous solution by adding hydrogen peroxide in the cold. However, the method used for the recovery treatment of the final aqueous solution will depend to a large extent on the use to which the recovered compound will be put.

In order to increase the efficiency of the process still further, the present invention includes as one of its aspects a continuous extraction and stripping process in which the ether is circulated in a closed path. At one portion of its path the ether is brought into contact with concentrated feed solution to extract the uranyl nitrate from the feed solution. In another portion of its path the ether extract is brought into contact with water in order to strip uranyl nitrate from the ether solution. Following this the stripped ether is recycled to the first part of its path to complete the cycle. This results in greatly increased economy in the process and is particularly important in the treatment of radioactive solutions since the necessity for handling the solutions and thus the danger to operators is reduced.

The accompanying drawing shows diagrammatically a flow sheet of a preferred embodiment of the process of the present invention, as described hereinafter. However, it is to be understood that the following description is not intended to limit the invention to the specific conditions disclosed.

A dilute solution of uranyl nitrate and other metallic nitrates obtained in the manner described above is fed to the evaporator 1 in the figure. The solution may contain initially as little as 0.1% uranium by weight as uranyl nitrate together with other metallic nitrates in varying concentrations. Usually at least one of the other nitrates is present in greater abundance than the uranyl nitrate.

In the evaporator 1 the uranium solution is concentrated virtually to saturation with respect to the metallic components. This may be done conveniently by evaporating water from the solution until the first signs of saturation are apparent and then re-diluting slightly. However, since, in order to achieve maximum efficiency in the extraction, it is desirable that the solution be virtually saturated with respect to the metallic nitrates other than uranyl nitrate, the concentration of these metallic nitrates may have to be increased by deliberately adding a nitrate salt, such as copper nitrate, to the solution. The metal nitrate salt may be added directly to the evaporator usually as a concentrated solution and preferably prior to the evaporation procedure. The important consideration in extracting the uranyl nitrate as provided by this invention is to increase the concentration of the nitrate salts other than uranyl nitrate substantially to saturation without regard to the uranyl nitrate concentration. Once this is done, the extraction may be carried out with maximum efficiency, the concentration of the uranyl nitrate having relatively little effect on the distribution ratio. Of course for the sake of economy in the volume of solution handled, it is desirable to use a solution as concentrated in uranyl nitrate as possible.

A typical analysis of such a solution after the concentrations of the nitrate salts in the solution have been adjusted to desirable values is given in Table I following. This is the feed solution for the extractor.

Table I

| Component: | Percent by weight |
| --- | --- |
| Uranium | 3.20 |
| Silicon | 0.013 |
| Iron | 0.089 |
| Copper | 6.65 |
| Chromium | 0.15 |
| Nickel | 0.065 |
| Manganese | 0.007 |
| Lead | 0.007 |
| Sodium | 0.029 |
| Chloride | 2.70 |
| Sulphate | 0.040 |
| Nitrate | 24.5 |

The solution also contained traces of aluminum, molybdenum, tin, silver, calcium, magnesium, zinc and ammonium ion. The acid concentration in the solution was greater than 1.0 N. The specific gravity of the solution was 1.379.

At this point the acidity of the solution is adjusted to a pH in the range of 0 to 2 by adding an alkali such as ammonium hydroxide or calcium hydroxide. This may be done conveniently either as a solution or as a thick slurry such as milk of lime. The adjustment of the pH to this range aids in reducing the extraction of copper nitrate and nitric acid and in preventing precipitation of various basic metallic compounds at higher pH's.

The concentrated solution is flowed by means of conduit 2 through the filter 30 and thence through conduit 3 to the feed tank 4. The filter is used to remove any suspended matter which may have been trapped in the original dilute uranium solution, and the filter cake may be retained for further recovery treatment. It is preferable to use the continuous type of filter to minimize handling of the filter cake and solutions.

The feed tank 4 is connected by means of the conduit 5 containing the valve 6 to the top of the extractor column, the valve 6 being used to control the rate of flow of uranium solution to the extractor column 31. The extractor column is generally cylindrical and may be for example, 2 to 5 inches in diameter and packed with Berl saddles, Raschig rings or other packing materials resistant to the solutions. The extractor column is generally fabricated in a conventional manner of Pyrex glass tubing or stainless steel tubing. Recycled diethyl ether is supplied to the lower part of the extractor column through the conduit 7 and flows upward through the extractor column where it meets the concentrated uranium solution flowing downward. The preferred ratio of solution to ether in the extraction is 1:1 by weight.

In the extraction column the diethyl ether selectively extracts substantially all the uranyl nitrate from the aqueous solution with a high degree of efficiency. The raffinate from the extractor column flowing outward through conduit 8 to the raffinate storage tank 9 generally contains less than 0.01% of uranium by weight. The raffinate may be subjected to various other recovery treatments in order to recover at least a portion of the dissolved metal salts.

The ether extract containing substantially all the uranium originally contained in the feed solution is fed through conduit 10 to a gravity feed tank 11. This ether solution is a relatively pure solution of uranyl nitrate and contains only small amounts of the metallic impurities originally in the concentrated feed solution to the extractor. It is, of course, saturated with water. The ether solution contained in the tank 11 is fed through conduit 12 to the lower portion of the stripping column 32 which is similar in construction and packing to the extraction column. Water, preferably distilled or de-ionized, is fed to the top of the stripping column and flows downward meeting the ether solution flowing upward, thereby stripping substantially all the uranyl nitrate from the ether. It has been found that a ratio of about 1:2 by weight of water to ether solution is sufficient to strip substantially all of the uranyl nitrate from the ether solution. The stripped ether, saturated with water and containing a small amount of uranium and metallic impurities, flows out of the top of the stripping column into a storage tank 12 through conduit 13. From the storage tank the stripped ether is flowed through conduit 14 to a still which may be a spray evaporator. Here the ether is distilled leaving a water solution containing the uranium and metallic impurities. The ether is condensed in the condenser 15 and is then pumped through conduits 16 and 7 back to the extractor where it meets the feed solution. Make-up ether is supplied to conduit 7 through conduit 33.

The water obtained from the distillation of the ether contains substantially all the impurities originally present in the stripped ether, together with a small quantity of uranium. These impurities include small amounts of various metal salts and some organic impurities. In order to recover the uranium contained in this solution it is recirculated to the evaporator 1. Since the volume of this aqueous solution is small relative to the volume of the feed solution, the impurities contained in the recovered solution have little effect. The important consideration is the recovery of all of the uranium.

Before mixing with the feed solution the aqueous solution containing the impurities originally in the ether extract is pumped from the still through conduit 17 to an evaporator 18 which may be simply a heated tank. Here water is evaporated from the solution to prevent dilution of the uranium feed solution. After evaporation, the solution is pumped through conduit 19 back to evaporator 1 and mixed with the feed solution.

The water solution obtained by stripping the ether contains virtually all the uranyl nitrate originally in the ether, and virtually no impurities or metallic nitrates other than uranyl nitrate. This purified aqueous solution is flowed from the stripping column through conduit 20 to the precipitator 21. The pH of the solution is then adjusted to about 1.5 either by the addition of ammonium hydroxide or nitric acid depending upon the original acidity. Usually the addition of ammonium hydroxide is required, and following this pH adjustment, sufficient hydrogen peroxide is added to the solution to precipitate the uranium. The solution is allowed to stand for a few minutes to promote crystal growth and thereafter the pH is adjusted to about 2 by the addition of ammonium hydroxide. The compound precipitated is uranium peroxide, $UO_4$, and the uranium is thereby separated from any small amounts of other metals carried along through the extraction and stripping procedure. After the precipitation the resultant slurry of uranium peroxide is pumped through conduit 23 to filter 34 to separate the uranium peroxide from the supernantant liquid. The filter cake is washed in place, dried and calcined to obtain pure, dry uranium peroxide.

The process described hereinabove has been operated economically and with great success in recovering uranium from solutions of the type described. The preferred embodiment is, as described, continuous in nature. However, batch extractions and strippings may be employed. When batch methods are used, however, more than one pass is usually required to obtain as high a degree of efficiency as is obtained with a continuous process.

The concentration of uranyl nitrate in the solution treated in accordance with the process described may vary over a wide range. Even after the metal nitrate content of the solution has been adjusted either by evaporation or by the deliberate addition of the metal nitrate salt, a solution containing as little as 1% uranium by weight after the adjustment may be treated successfully in the manner described.

In preparing the feed solutions by concentrating the dilute uranyl nitrate solution, the concentration of the nitrate salts other than uranyl nitrate is increased virtually to saturation. The density of the solution may be used as a convenient measure of the degree of saturation, and it is desirable to increase the density until the specific gravity is in excess of about 1.35 and preferably in excess of about 1.55. In order to take advantage of the salting-out action of the metal nitrates on uranyl nitrate the total concentration of all the metal nitrates must be in excess of the concentration of the uranyl nitrate. Although it is preferred to use copper nitrate in order to make up any deficit in the metal nitrates other than uranyl nitrate, any of the other metal nitrate salts may be used, particularly those forming definite hydrates, that is, such salts as calcium nitrate, ferric nitrate, etc.

The equipment used in carrying out the described process must, of course, be resistant to nitric acid, and for this purpose it is desirable to use ceramic packing, stainless steel columns, glass equipment and the like.

Other alternatives will be apparent to those skilled in the art.

Since many embodiments might be made of the present invention and since many changes might be made in the embodiment described, it is to be understood that the foregoing description is to be interpreted as illustrative only and not in a limiting sense.

I claim:

1. A process for recovering uranium from an aqueous solution of uranyl nitrate containing other metal nitrates including copper nitrate which comprises successively increasing the concentration of the copper nitrate substantially to saturation, treating the resultant aqueous solution with diethyl ether to extract the uranyl nitrate therefrom to obtain an ether solution of uranyl nitrate and stripping the ether solution of uranyl nitrate with water to obtain aqueous uranyl nitrate.

2. A process for recovering uranium from an aqueous solution of uranyl nitrate containing copper nitrate in a concentration greater than that of uranyl nitrate which comprises successively evaporating water from said solution to increase the concentration of the copper nitrate substantially to saturation, adjusting the pH of said solution to a value in the range of 0 to 2, treating the resultant aqueous solution with diethyl ether in a ratio of 1 to 1 by weight to extract the uranyl nitrate therefrom to obtain an ether solution of uranyl nitrate and stripping the ether solution of uranyl nitrate with water in the ratio of about 2 to 1 by weight to obtain aqueous uranyl nitrate.

3. A process for recovering uranium from an aqueous solution of uranyl nitrate containing other metal nitrates including copper nitrate which comprises successively increasing the concentration of the copper nitrate substantially to saturation, adjusting the pH of the solution to a value in the range of 0 to 2, treating the resultant aqueous solution with diethyl ether to extract the uranyl nitrate therefrom to obtain an ether solution of uranyl nitrate, stripping the ether solution of uranyl nitrate with water to obtain aqueous uranyl nitrate, adjusting the pH of the resultant aqueous uranyl nitrate to about 1.5, adding hydrogen peroxide to the solution to precipitate uranium peroxide and thereafter filtering the uranium peroxide from said solution.

4. A process for recovering uranium from an aqueous solution of uranyl nitrate containing copper nitrate in a concentration at least as great as the concentration of uranyl nitrate which comprises evaporating water from said solution to increase the concentration of the copper nitrate substantially to saturation to obtain a feed solution, circulating a stream of diethyl ether in a closed path, contacting said ether stream in a first portion of its path with said feed solution to extract the uranyl nitrate therefrom, contacting the ether stream in another portion of its path with water to strip the uranyl nitrate from the ether extract and recycling the ether to the said first portion of its path for contact with said feed solution.

References Cited in the file of this patent
UNITED STATES PATENTS 2,227,833     Hixson et al. _____ Jan. 7, 1941

OTHER REFERENCES

Misciatelli: Philosophical Magazine, Ser. 7, vol. 7, pp. 670–674 (1929).

Misciatelli: Gazetta Chimica Italiana, vol. 60, pp. 833–842 (1930).

Mellor: Comprehensive Treatise on Inorganic and Theoretical Chemistry, vol. 12, pp. 69–70 (1932). Pub. by Longmans, Green & Co., London.

Bentzen et al.: U. S. Atomic Enery Comm., declass. paper No. 3065, dated Sept. 19, 1945, declass. date Feb. 27, 1951, pp. 5 and 6.